United States Patent
Rolfes

(10) Patent No.: US 6,269,735 B1
(45) Date of Patent: Aug. 7, 2001

(54) LIQUID DETECTABLE WATERTIGHT COFFEE BREWER ENCLOSURE

(76) Inventor: Patrick J. Rolfes, 2006 Seadrift Dr., Corona Del Mar, CA (US) 92625

( * ) Notice: Subject to any disclaimer, the term of this patent is extended or adjusted under 35 U.S.C. 154(b) by 0 days.

(21) Appl. No.: 09/561,895

(22) Filed: May 1, 2000

(51) Int. Cl.⁷ .................................................... A47J 31/00

(52) U.S. Cl. ................................. 99/279; 99/285; 99/304

(58) Field of Search ........................... 99/304, 307, 306, 99/305, 280, 285, 279, 295

(56) References Cited

U.S. PATENT DOCUMENTS

| | | | |
|---|---|---|---|
| 3,606,829 | * 9/1971 | Alwood | 99/306 X |
| 3,996,846 | * 12/1976 | Hupf | 99/307 |
| 4,069,750 | * 1/1978 | Kemp | 99/280 |
| 4,103,603 | * 8/1978 | Bergmann et al. | 99/304 X |
| 4,558,640 | * 12/1985 | Marchant | 99/307 |
| 4,969,392 | * 11/1990 | Steele et al. | 99/305 X |
| 5,063,836 | 11/1991 | Patel | 99/281 |
| 5,404,794 | 4/1995 | Patel et al. | 99/280 |
| 5,687,636 | * 11/1997 | Diore et al. | 99/304 X |
| 5,836,236 | 11/1998 | Rolfes et al. | 99/290 |
| 5,875,703 | 3/1999 | Rolfes | 99/283 |

* cited by examiner

Primary Examiner—Reginald L. Alexander
(74) Attorney, Agent, or Firm—Gordon K. Anderson

(57) ABSTRACT

A watertight enclosure is presented which has the capabilities of housing not only coffee brewing apparatus but also a liquid detector for the prevention of leaking water from the inside of the housing if some abnormally is present in the liquid system. The enclosure (20) consists of a base (22), configured with an extended portion (24) suitable for receiving a coffee server, a top (26) with an overhanging shelf (28) aligned with the base extended portion for dispensing brewed coffee into a coffee server, an integral front (30), back (32), and a pair of sides (34). The top and back each have a removable portion (36) and (40) for access into the enclosure to house brewing apparatus. A liquid detector (46) may be disposed within the enclosure with sensors between the base and the access opening for recognizing the presence of liquid allowing its internal system to de-energizing the brewing apparatus within the enclosure. The liquid detector functions by sensing the presence of liquid that may have accumulated within the housing and therefore preventing the overflowing of this undesirable liquid from the complete coffee brewer incorporated in the housing.

14 Claims, 5 Drawing Sheets

LIQUID DETECTABLE WATERTIGHT COFFEE BREWER ENCLOSURE

TECHNICAL FIELD

The present invention relates to coffee brewers in general. More specifically to a watertight coffee brewer enclosure with liquid detection to prevent overflowing of water from leakage within the brewer.

BACKGROUND ART

Previously, many types of enclosures have been used to protect and envelop coffee brewing apparatus however in most cases the enclosures have been constructed of sheet metal formed by bending into specific shapes. In most cases the enclosures are not watertight and do not provide any assurance of protection if a leak is encountered within the system.

A search of the prior art did not disclose any patents that read directly on the claims of the instant invention, however the following U.S. patents are considered related:

| Patent Number | Inventor | Issue Date |
| --- | --- | --- |
| 5,875,703 | Rofles | Mar. 2, 1999 |
| 5,836,236 | Rofles et al. | Nov. 17, 1998 |
| 5,404,794 | Patel et al. | Apr. 11, 1995 |
| 5,063,836 | Patel | Nov. 12, 1991 |

Rofles own U.S. Pat. No. 5,875,703 teaches an improvement on a coffee brewer and hot water dispenser which permits larger capacity by the use of a bypass hot water cycle adding a predetermined volume of water to the container and supplementing the control by expanding its capabilities using multiple sequencing or the brew cycle for increasing the volume of brewed coffee. The enclosure is conventional metal components including a separate base column, housing, cover, back, plate etc. No liquid detector is included in the solid state electronic controller.

U.S. Pat. No. 5,836,236 issued to Rofles et al., in which the first named inventor is the present inventor, discloses a coffee brewer and hot water dispenser which brews both coffee and also dispensed hot water from a separate system, both housed in the same enclosure. The enclosure is the same as above being fabricated utilizing conventional sheet metal techniques which are cut in the flat and bent or joggled to form the structure then painted and finally bolted or riveted together to complete the enclosure. Again no mention is given to add a liquid detector as its use would not be practical with the type of construction taught for fabricating the enclosure.

U.S. Pat. No. 5,404,794 of Patel et al. discloses a coffee making machine having a reservoir connected to an external water supply via a valve which divides the water into separate hot and cold water tanks. Heated water from a boiler is fed into an expansion chamber and then discharged into the ground coffee through a spray head at the end of an expansion chamber. The enclosure is made of a pair of laterally spaced rectangular arms forming a base with a column located at one end which basically houses most of the operating parts of the coffee-making machine. Again no provisions are made for any leak prevention.

Patel in U.S. Pat. No. 5,063,836 teaches a coffee making machine of the type adapted to be connected to city water supply. The device includes a reservoir having a level sensor controlling a water refill valve to the reservoir and a heating element which heats the water therein. A level sensor functions to permit automatic refill of the reservoir at the appropriate level for subsequent brewing of a full pot of coffee irrespective of the water pressure and the previous route of the water. A solid state circuit board controls the operational sequence and functions of the machine. The device includes a base with a warming plate on which a coffee pot may rest and columns upon which most of the operating components are mounted. There is little more taught about the enclosure however in viewing the product protected by this patent the material is metal formed and attached together in a conventional manner. As above, no mention is made of the desirability of protecting the machine from leakage since its construction would not permit this function.

DISCLOSURE OF THE INVENTION

In the past enclosures used in coffee brewers for the workplace, in both the automatic types connected to a constant water supply and those that require the manual addition of water to start the brewing process, have been contained within metallic enclosures which function well and are sturdy however they have drawbacks that allow room for improvement. One of the undesirable features is that if any water is present within the container, such as caused by a leak in the connecting piping or by splashing, it simply seeps out onto the surface on which the brewer is resting through the interface between the metal panels that make up the enclosure. It is therefore a primary object of the invention to fabricate an enclosure out of thermoplastic in one piece which is impervious to water and as such creates a reservoir in the bottom retaining any water that is present within. The invention utilizes this type of construction, formed by the rotation molding process, which produces a completely water tight surface since no joints are present that could permit the passage of water. Further the housing may still have removable panels and access openings at the appropriate locations and structure inside to mount the brewing apparatus common to this equipment.

Since the enclosure is watertight it is now possible to include another important object of the invention which is the addition of a liquid detector disposed within enclosure itself between the bottom and an arbitrary level created by the limitations set by the access opening in the back. This area becomes a sump retaining the water present and the liquid detector then senses the presence of this liquid permitting de-energizing of brewing apparatus contained within the enclosure preventing an undesirable overflowing of water. This is accomplished by the use of a pair of sensing probes that are located within the interior of the housing consisting of metallic rods distending adjacent to each enclosure side and reach almost to the bottom. An electrical signal is continually transmitted from a control module to one of the metallic rods and when water is present current is then passed through the accumulated water in the enclosure, acting as a conductor completing the electrical circuit through the remaining probe, which is also in contact with liquid, and then back to the control module. The control module sends a signal to the brewing equipment which de-energizes the inlet water supply circuit preventing overflow. The module simultaneously lights an indicator that registers this condition to the users of the brewer permitting them to remedy the immediate problem without water damage to the surrounding area which would be obviously undiscovered if the brewer was unattended.

Another object of the invention is that with this type of construction there are no seams or sharp corners making the enclosure easy to clean. Since the brewer produces a food product it is essential that the surfaces are clean and sanitary at all times which may be a problem with metallic enclosures that have inherent overlapping seams and joints where fungus and microorganisms may grow and reproduce if not cleaned properly.

Still another object of the invention is that with a molded construction the server cradle may be configured to perfectly position the server every time it is used. This advantage is realized by being able to duplicate the exact shape of the server in reverse image as the enclosure is molded from a pattern that is always uniform permitting a consistent fit for precise alignment with the brew cone above.

Yet another object of the invention is that the enclosure is now formed from a dielectric material that prevents electrical shock as the brewing apparatus utilizes electrical power that may be shorted against the inside of the enclosure. The electrical conductivity of the thermoplastic material is almost nil therefore the equipment may be used without any fear from any electrical shock anomaly.

A final object of the invention is that molded thermoplastic permits a sleek contemporary design that is appealing to the eye and improves the cosmetic appearance of a coffee brewer in an office or commercial environment. Further, the cost of production of using this type of material is considerably less than individual sheet metal construction since molded thermoplastic is formed almost automatically, once the expensive tooling is amortized over a time period, the piece cost is greatly reduced.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
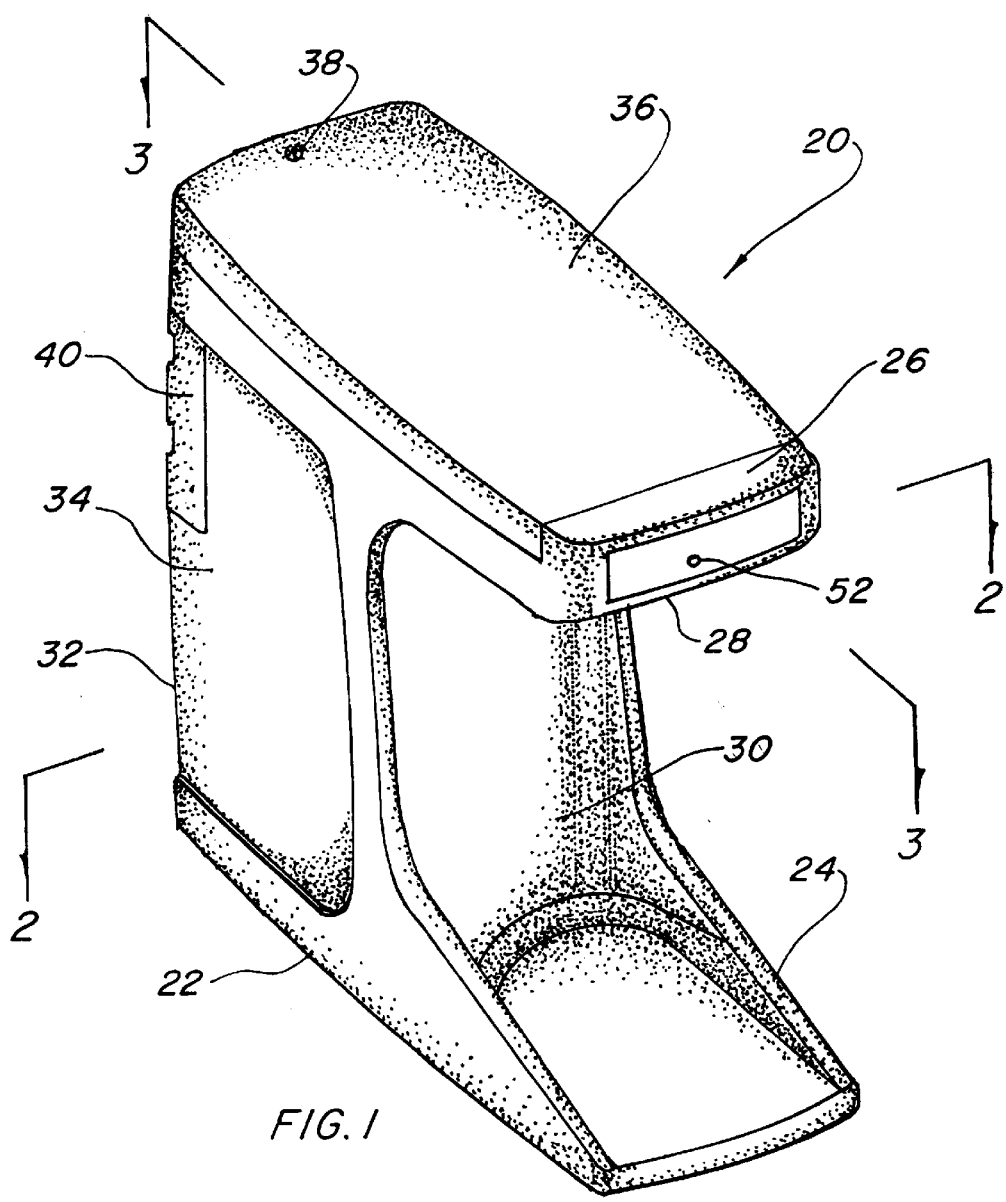
FIG. 1 is a partial isometric view of the preferred embodiment with only the liquid detector mounted within the enclosure and the brewing apparatus is omitted for clarity.

The best mode for carrying out the invention is presented in terms of a preferred embodiment. This preferred embodiment is shown in FIGS. 1 through 10 and is comprised of a watertight enclosure 20 which consists of a base 22, configured with an extended portion 24 suitable for receiving a coffee server, a top 26 with an overhanging shelf 28 aligned with the base extended portion 24 permitting the dispensing of brewed coffee into a coffee server. The enclosure 20 also includes an integral front 30, an integral back 32, and a pair of integral sides 34. The overhanging shelf 28 and base extended portion 24 are illustrated best in FIGS. 1, 4 and 5 and create an indentation in the enclosure permitting the retention of a conventional coffee server such as a vacuum insulated type commonly produced under the registered trademark THERMOS. The base extended portion is configured to accept this type of server securely as it is formed in the exact mirror image of the servers radial bottom. The base 22 is flat in this area forming a platform for ease of alignment with the internal equipment of the brewer which is housed within the overhanging shelf 28 as a brew cone is positioned directly under the shelf 28 in direct alignment with the server. It is obvious that alignment is critical and the invention is configured to overcome any potential problems.

Figure 4:
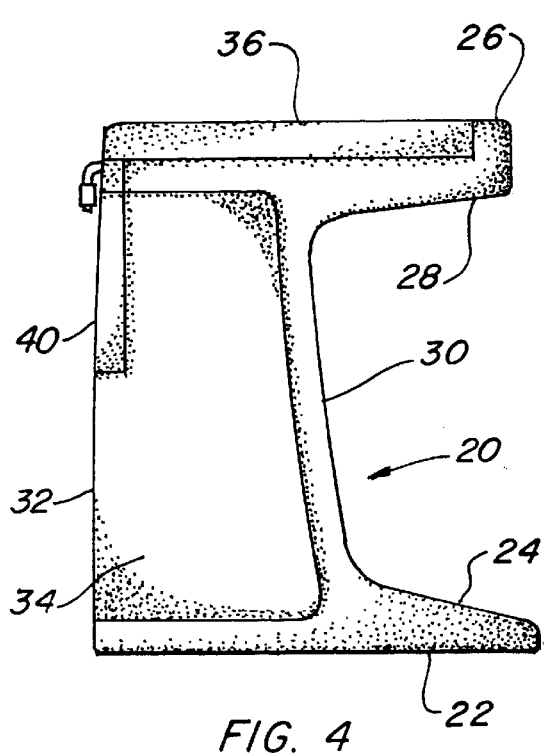
FIG. 4 is a left side elevation view of the preferred embodiment.
Figure 5:
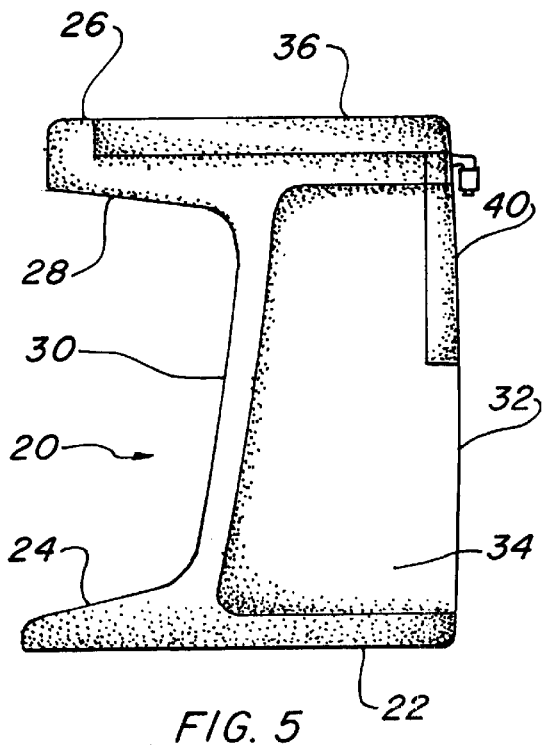
FIG. 5 is a right side elevation view of the preferred embodiment.

As illustrated in FIGS. 1, 4 and 5 the top 26 includes a top removable portion 36 for access into the enclosure which houses the brewing apparatus. This removable portion 36 is formed of the same material as the balance of the enclosure 20 and is attached by conventional threaded fasteners 38 either into the material itself or with metallic inserts. When attached, this top is basically flat with radial edges and corners as illustrated to aesthetically mate with the balance of the structure.

The back 32 also includes a rear removable portion 40 for additional access into the enclosure to permit the larger brewing apparatus to be easily installed. The rear removable portion 40 interfaces with the top removable portion 36 on one edge and is connected together in the same manner as described above.

Figure 6:
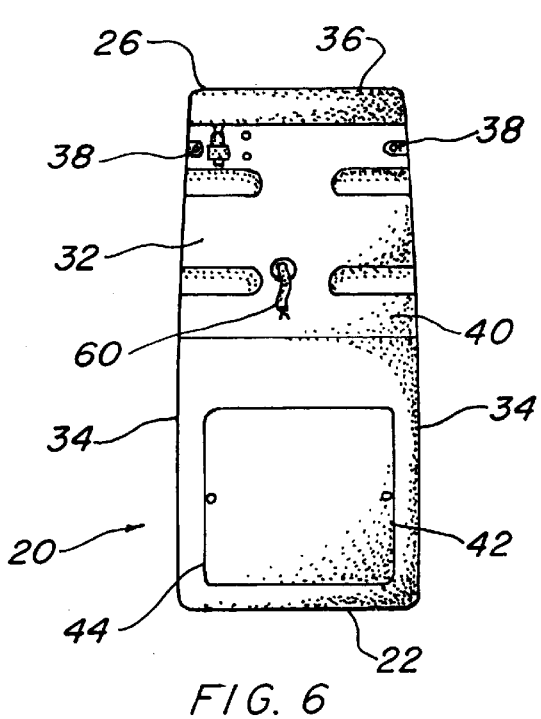
FIG. 6 is a back view of the preferred embodiment.
Figure 7:
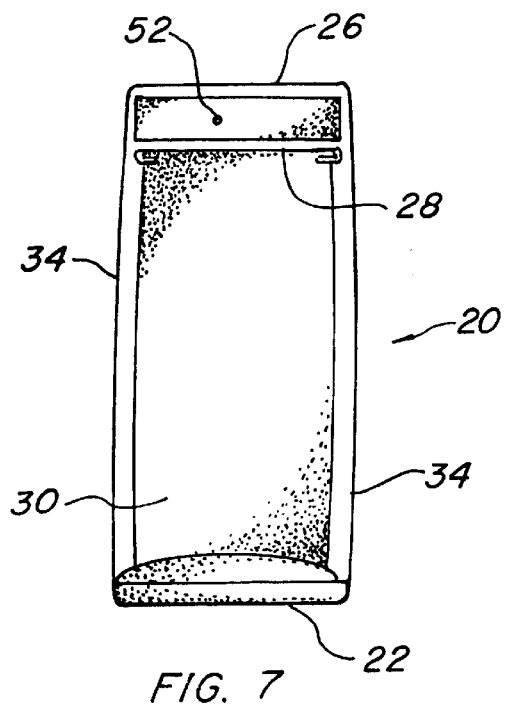
FIG. 7 is a front view of the preferred embodiment.

An access opening 42 is provided in the back 32 just beneath the rear removable portion 40 as illustrated in FIG. 6 and is protected with a cover 44 that fits into a slight joggled recess in the periphery of the opening such that the cover is flush with the outside surface of the back 32. This cover 44 may be any material such as the same substance as the housing or metal with aluminum sheet preferred.

It should be noted that the enclosure contains radial curves on all intersecting corners and the sides are slightly curved inwardly at the top. The intersection between the extended portion of the base 22 and the overhanging shelf of the top 26 is also curved inwardly forming a graceful arch to add a pleasing appearance to the housing.

The material of the enclosure 20 is thermoplastic which permits the shape to be easily molded and the color to be inherent in the material itself making it easy to clean and not wear through the finish, as often occurs with metallic structures. While linear low density polyethylene is the preferred material many other substances and formulations may be used with equal ease such as butyrate, vinyl, polystyrene, acrylonitrile butadiene styrene also known as (ABS), polycarbonate, nylon, acetyl or urethane.

The enclosure 20 is formed best using rotational molding where a measured amount of powdered resin is loaded into hollow molds. The molds are then rotated simultaneously on two axes while they are moved through heating and cooling cycles. The enclosures are then removed from the molds and any access material and flash is trimmed off. No further surface treatment is necessary as the color combination is mixed together in the resin and the interior of the mold provides the surface texture and outside finish.

A liquid detector 46 may be disposed within enclosure 20 between the bottom of the base 22 and the lower edge of the access opening 42 for sensing the presence of liquid in the form of condensate or cold and hot water permitting de-energizing of the brewing apparatus contained within the enclosure. Leakage is accumulated in the bottom of the enclosure and since the enclosure 20 is waterproof, the undesirable overflowing of liquid is completely prevented. The leak detector 46 consists of a solid state electronic control module 48, a pair of probes 50, an indicator light 52 and a signal circuit 54 for disengaging the source of water to the brewer. The block diagram for this relationship is shown in FIG. 9 and the elements attached together schematically in FIG. 8.

Figure 8:
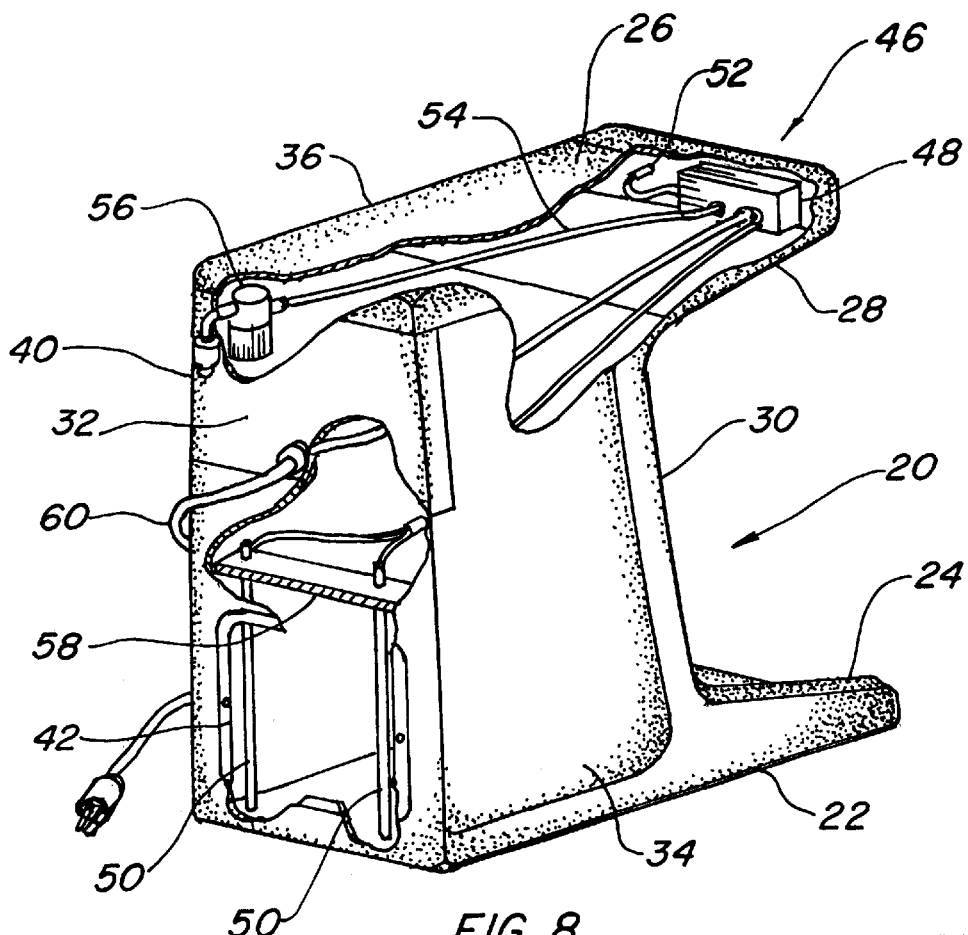
FIG. 8 is a cut away partial isometric view of the enclosure including the liquid detector.
Figure 9:
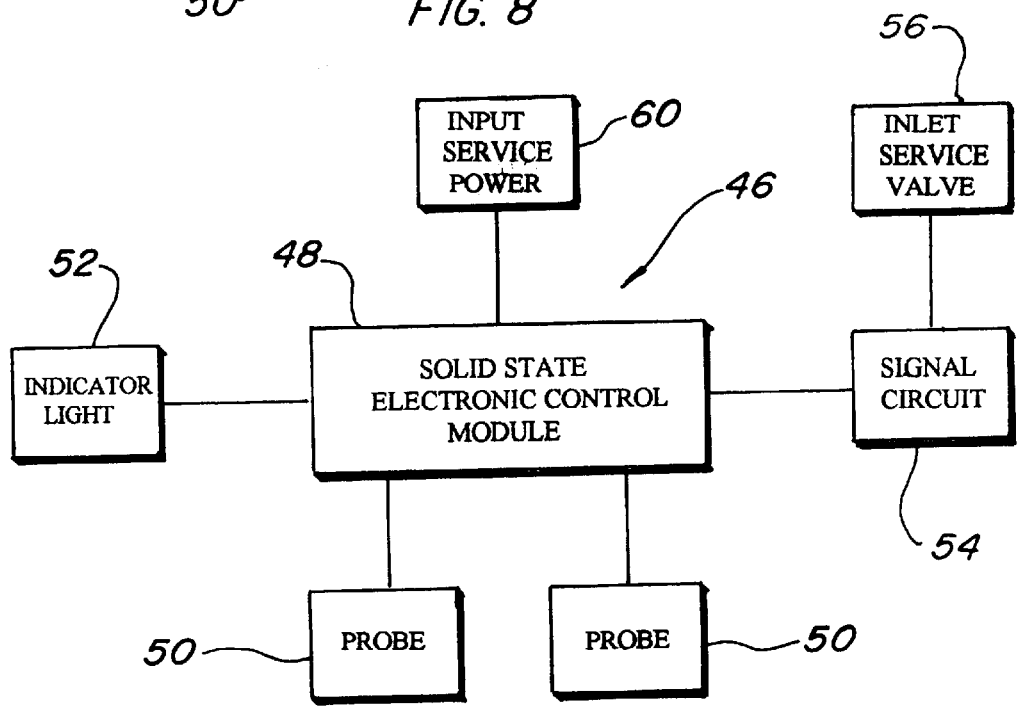
FIG. 9 is a block diagram of the liquid detector.
Figure 10:
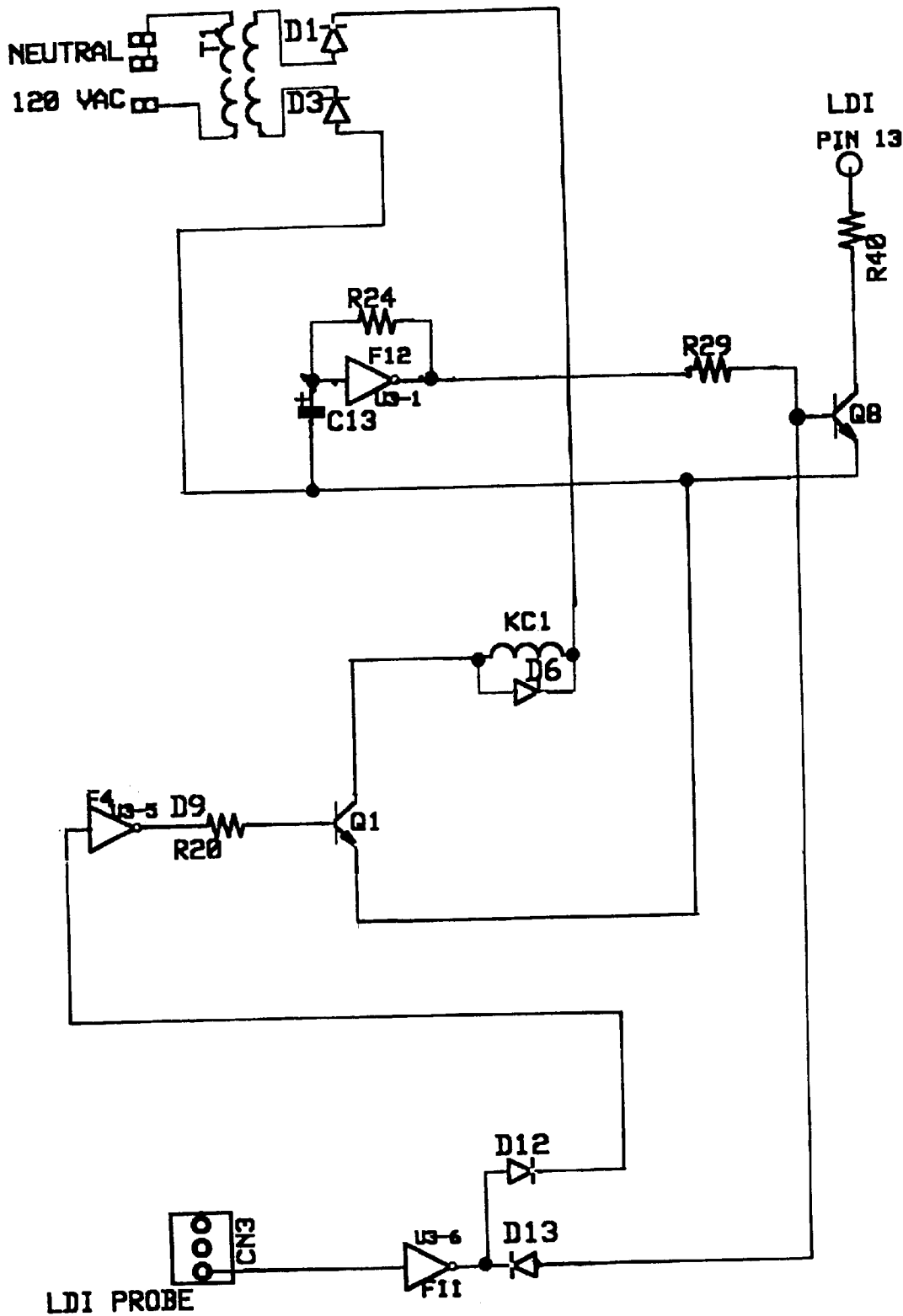
FIG. 10 is an electrical schematic diagram of the liquid detector in the self contained discrete configuration.

The solid state electronic control module 48 may be discrete and completely self contained as shown in FIG. 8 or integrated into an existing electronic controller contained within the enclosure which is part of the basic coffee brewing apparatus. In either event the self contained or integrated control functions by disengaging the inlet service valve 56 supplying water to the brewer and the indicator light 52 may be combined with existing lights on a brewer control panel. The function is the same in both embodiments and operates when there has been liquid present within the base of the enclosure, simultaneously lighting the indicator 52 and de-energizing the inlet service valve 56. The schematic for the self contained module 48 is depicted in FIG. 10 and is the same for the integrated configuration except it shares some of the common elements for supplying the input power etc.

Figures 2, 3:
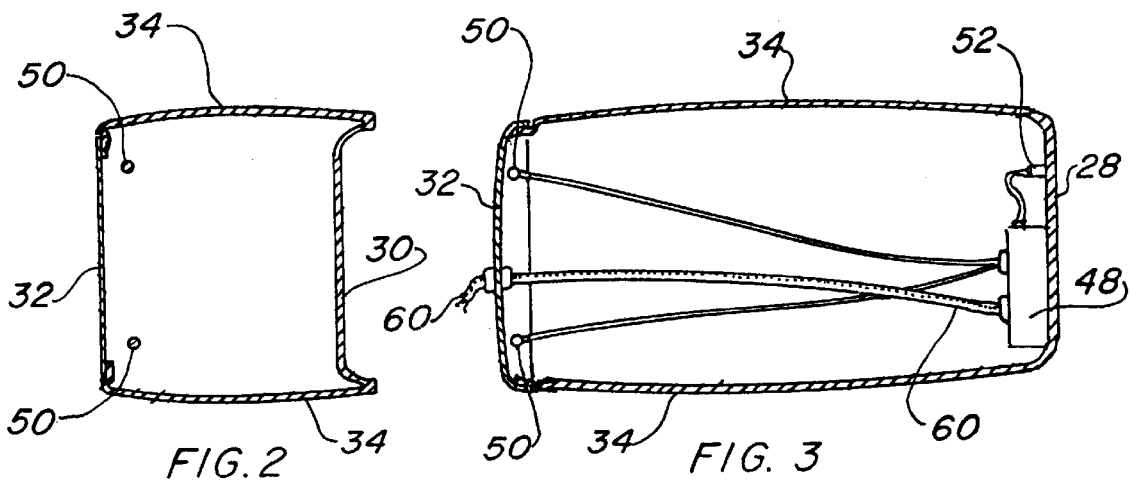
FIG. 2 is a cross sectional view taken along lines 2—2 of FIG. 1 with only the probes of the liquid detector visible.
FIG. 3 is a cross sectional view taken along lines 2—2 of FIG. 1 with all of the elements of the liquid detector visible.

The probes 50 consist of a pair of metallic rods that distend within the enclosure adjacent to each side 32 with the ends positioned near the bottom of the base 22 as shown in FIGS. 2, 3, and 8. These probes 50 are metallic in structure and are preferably made of stainless steel, however other materials may be used provided they are capable of being a conductor of electricity. The enclosure 20 has provisions to mount the probes 50 in the form of an integral platform 58 containing holes through which the probes are inserted holding them securely in place and since the material of the housing 20 is dielectric the platform also acts as an insulator.

The liquid detector 46 with its elements connected operates using an electrical signal transmitted from the control module 48 to a single probe 50 which is passed through the accumulated water in the enclosure. The water acts as a conductor therefore completing the electrical circuit through the remaining probe 50, which is also in contact with liquid, allowing a return circuit to be completed to the control module 48. When the circuit is complete the light 52 is illuminated and the signal circuit 54 de-energizes the inlet service valve 56 isolating the water flow and pressure from the input service power 60.

The indicator light 54 is preferably a light emitting diode (LED) that is mounted in the overhanging shelf 28 of the enclosure 20 either by itself or in conjunction with other LED's that are part of the brewing apparatus. This light and its circuitry are well known in the art and in common use in similar applications.

Figure 11:
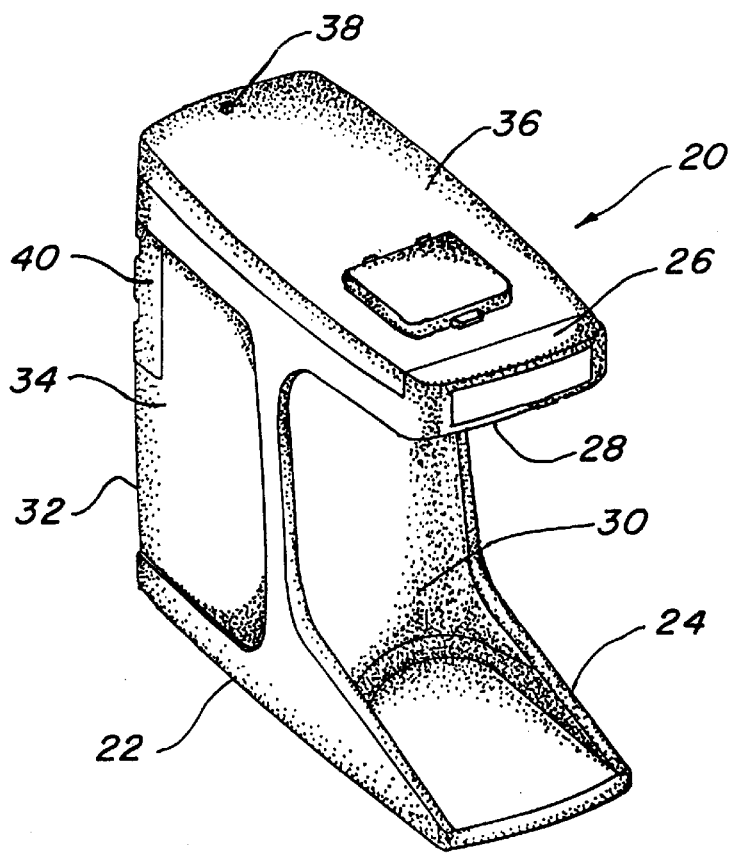
FIG. 11 is a partial isometric view of the enclosure used for a pour over type unit.
Figure 12:
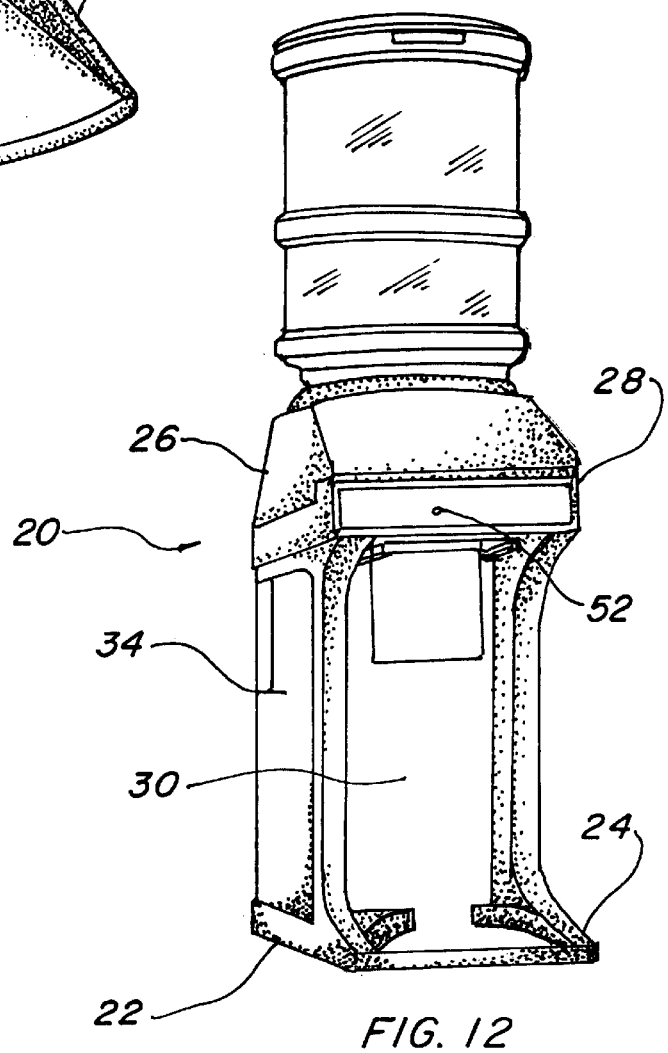
FIG. 12 is a partial isometric view of the enclosure used for a bottled water type unit.

It will be noted that the enclosure 20 may be used not only for coffee brewers that are attached to a water source but also to so called "pour over units" 62 that function by adding water by hand as illustrated in FIG. 11. The same utility is achieved with the bottled water units 64 that have the water bottle mounted on top of the enclosure, such as depicted in FIG. 11 which function using a similar type of service valve to control water flow from the bottle.

While the invention has been described in complete detail and pictorially shown in the accompanying drawings, it is not to be limited to such details, since many changes and modifications may be made in the invention without departing from the spirit and scope thereof. Hence, it is described to cover any and all modifications and forms which may come within the language and scope of the appended claims.

What is claimed is:

1. A watertight coffee brewer enclosure for housing a brewing mechanism comprising:

a watertight enclosure having, a base configured with an extended portion suitable for receiving a coffee server, a top with an overhanging shelf aligned with said base extended portion configured to permit brewed coffee to flow into a coffee server positioned beneath, an integral front, an integral back, and a pair of integral sides, said top having a removable portion for access into the enclosure, and said back having an access opening also a removable portion for additional access into the enclosure.

2. The watertight coffee brewer enclosure as recited in claim 1 wherein said enclosure further comprises radial curves on all intersecting corners.

3. The watertight coffee brewer enclosure as recited in claim 1 wherein said enclosure is formed of a thermoplastic.

4. The watertight coffee brewer enclosure as recited in claim 3 wherein said thermoplastic is polyethylene.

5. The watertight coffee brewer enclosure as recited in claim 3 wherein said enclosure is formed by rotational molding.

6. The watertight coffee brewer enclosure as recited in claim 1 further comprising, a liquid detector disposed within said enclosure between the base and the access opening for sensing the presence of liquid permitting de-energizing of the brewing mechanism contained within the enclosure to prevent an undesirable overflowing of liquid.

7. A watertight coffee brewer enclosure comprising: p1 a watertight enclosure having, a base configured with an extended portion suitable for receiving a coffee server, a top with an overhanging shelf aligned with said base extended portion for dispensing brewed coffee into a coffee server, an integral front, an integral back, and a pair of integral sides, said top having a removable portion for access into the enclosure to house brewing apparatus therein, said back having an access opening also a removable portion for additional access into the enclosure to house brewing apparatus and, a liquid detector disposed within said enclosure between the base and the access opening for sensing the presence of liquid permitting de-energizing of the brewing apparatus contained within the enclosure in the presence of leakage accumulated therein to prevent an undesirable overflowing of liquid.

8. The watertight coffee brewer enclosure as recited in claim 7 wherein said liquid detector further comprises a solid state electronic control module, a pair of probes and a indicator light.

9. The watertight coffee brewer enclosure as recited in claim 8 wherein said control module is discrete and self contained.

10. The watertight coffee brewer enclosure as recited in claim 8 wherein said control module is integrated into a controller contained within the enclosure of a coffee brewer which functions by disengaging an inlet service valve supplying water to a brewer and said indicator light is combined with existing lights on a brewer control panel when there has been liquid present within the enclosure and the inlet service valve is de-energized.

11. The watertight coffee brewer enclosure as recited in claim 8 wherein said probes are metallic rods distending within the enclosure adjacent to each side and near a bottom surface of the base.

12. The watertight coffee brewer enclosure as recited in claim 11 wherein an electrical signal is transmitted from said control module to a single metallic rod which is passed through accumulated liquid in the enclosure, acting as a conductor therefore completing an electrical circuit through the remaining probe, which is also in contact with liquid, back to the control module.

13. The watertight coffee brewer enclosure as recited in claim 8 wherein said indicator light is a light emitting diode.

14. A watertight coffee brewer enclosure for housing a brewing mechanism comprising:
- a watertight enclosure having, a base configured with an extended portion suitable for receiving a coffee server, an integral top with an overhanging shelf aligned with said base extended portion configured to permit brewed coffee to flow into a coffee server positioned beneath, an integral front, back, and sides, and
- a integrally formed plurality of device's for mounting a liquid detector within said watertight enclosure for sensing the presence of liquid permitting de-energizing of brewing equipment contained within the enclosure to prevent overflowing of liquid.

* * * * *